US012791712B2

(12) United States Patent
Wendel

(10) Patent No.: US 12,791,712 B2
(45) Date of Patent: Nov. 10, 2026

(54) SYSTEMS AND METHODS FOR DETECTING AND MEASURING OBJECT VELOCITY USING SINGLE SCAN LIDAR DETECTION

(71) Applicant: Kodiak Robotics, Inc., Mountain View, CA (US)

(72) Inventor: Andreas Wendel, Mountain View, CA (US)

(73) Assignee: Kodiak Robotics, Inc., Mountain View, CA (US)

( * ) Notice: Subject to any disclaimer, the term of this patent is extended or adjusted under 35 U.S.C. 154(b) by 987 days.

(21) Appl. No.: 18/147,439

(22) Filed: Dec. 28, 2022

(65) Prior Publication Data

US 2024/0219565 A1 Jul. 4, 2024

(51) Int. Cl.

| | |
|---|---|
| ***G01S 17/58*** | (2006.01) |
| ***G01S 7/481*** | (2006.01) |
| ***G01S 17/89*** | (2020.01) |
| ***G01S 17/931*** | (2020.01) |

(52) U.S. Cl.

CPC ............ *G01S 17/58* (2013.01); *G01S 7/4817* (2013.01); *G01S 17/89* (2013.01); *G01S 17/931* (2020.01)

(58) Field of Classification Search

None

See application file for complete search history.

(56) References Cited

U.S. PATENT DOCUMENTS

| | | | | |
|---|---|---|---|---|
| 12,240,445 | B1 * | 3/2025 | Purdy | B60W 30/0956 |
| 2018/0011196 | A1 * | 1/2018 | Pennecot | G01S 7/4815 |
| 2020/0142073 | A1 * | 5/2020 | Gassend | G01S 17/10 |
| 2023/0213628 | A1 * | 7/2023 | LaChapelle | G01S 7/4816 356/5.01 |

* cited by examiner

*Primary Examiner* — Eric L Bolda

(74) *Attorney, Agent, or Firm* — Fox Rothschild LLP

(57) ABSTRACT

Systems and methods for detecting and measuring object velocity are provided. The method comprises, using a spinning Light Detection and Ranging (LiDAR) system, generating a first LiDAR point cloud of an environment surrounding a vehicle, using a scanning LiDAR system, generating a second LiDAR point cloud of the environment surrounding the vehicle, and, using a processor, identifying points within the first LiDAR point cloud coinciding with a position of an object and points within the second LiDAR point cloud coinciding with a position of the object, determining whether the points within the second LiDAR point cloud line up with the points within the first LiDAR point cloud, and, when the points within the second LiDAR point cloud do not line up with the points within the first LiDAR point cloud, determining that the object is moving.

20 Claims, 7 Drawing Sheets

SYSTEMS AND METHODS FOR DETECTING AND MEASURING OBJECT VELOCITY USING SINGLE SCAN LIDAR DETECTION

BACKGROUND

Field of the Disclosure

Embodiments of the present disclosure relate to object velocity detection and measurement using LiDAR detection and, in particular, to detecting and measuring object velocity using single scan LiDAR detection.

Description of the Related Art

For an autonomous vehicle to safely traverse the environment surrounding the autonomous vehicle must determine not only characteristics of the terrain of the environment, but also any objects located within the environment. These objects may be moving or stationary.

For objects that are stationary, their size, shape, and position/location can be used in order to enable the autonomous vehicle to avoid colliding with the objects. For objects that are moving, while their size and shape may or may not change, their position/location does change with time. Therefore, for moving objects, the velocity and/or trajectory of the moving objects must be determined in order to estimate the moving objects' future position in order to aid the autonomous vehicle to avoid colliding with the moving objects.

To detect objects and potential hazards, autonomous vehicles are often equipped with one or more types of environmental sensing technologies, such as, e.g., photographic imaging systems and technologies (e.g., cameras), radio detection and ranging (RADAR) systems and technologies, and Light Detection and Ranging (LiDAR) systems and technologies.

A LIDAR sensor is configured to emit light, which strikes material (e.g., objects) within the vicinity of the LiDAR sensor. Once the light contacts the material, the light is deflected. Some of the deflected light bounces back to the LiDAR sensor. The LiDAR sensor is configured to measure data pertaining to the light bounced back (e.g., the distance traveled by the light, the length of time it took for the light to travel from and to the LiDAR sensors, the intensity of the light returning to the LiDAR sensor, etc.). This data can then be used to generate a point cloud of some or all of the environment around the LiDAR sensor, generally recreating an object map of the objects within the environment.

When used on a vehicle, the LiDAR sensor can be used to detect one or more objects within the environment surrounding the vehicle. LiDAR technology is sometimes used in order to determine object velocity. However, LiDAR motion analysis generally requires multiple scans of an environment from a LiDAR sensor and also needs the incorporation of tracking algorithms in order to analysis the motion of one or more objects. This increases the number of data points, processing power, and time needed to analyze object motion.

Therefore, for at least these reasons, systems and methods for more accurately detecting objects and measuring object velocities using single scan LiDAR detection are needed.

SUMMARY

According to an aspect of the present disclosure, a method for detecting and measuring object velocity is provided. The method comprises, using a spinning Light Detection and Ranging (LiDAR) system, generating a first LiDAR point cloud of an environment surrounding a vehicle, using a scanning LiDAR system, generating a second LiDAR point cloud of the environment surrounding the vehicle, and, using a processor, identifying points within the first LiDAR point cloud coinciding with a position of an object and points within the second LiDAR point cloud coinciding with a position of the object, determining whether the points within the second LiDAR point cloud line up with the points within the first LiDAR point cloud, and, when the points within the second LiDAR point cloud do not line up with the points within the first LiDAR point cloud, determining that the object is moving.

According to various embodiments, the method may further comprise, using the processor, when the points within the second LiDAR point cloud do not line up with the points within the first LiDAR point cloud, determining a velocity of the object based on a difference in position between the points within the second LiDAR point cloud and the points within the first LiDAR point cloud.

According to various embodiments, the method may further comprise, using the processor, when the points within the second LiDAR point cloud line up with the points within the first LiDAR point cloud, determining that the object is not moving.

According to various embodiments, the first LiDAR point cloud is generated using a single scan from the spinning LiDAR system.

According to various embodiments, the second LiDAR point cloud is generated using a single scan from the scanning LiDAR system.

According to various embodiments, the spinning LiDAR system is coupled to the scanning LiDAR system.

According to another aspect of the present disclosure, a system for detecting and measuring object velocity is provided. The system comprises a spinning LiDAR system, coupled to a vehicle, configured to generate a first LiDAR point cloud of an environment surrounding the vehicle, a scanning LiDAR system, coupled to the vehicle, configured to generate a second LiDAR point cloud of the environment surrounding the vehicle, and a processor, configured to identify points within the first LiDAR point cloud coinciding with a position of an object and points within the second LiDAR point cloud coinciding with a position of the object, determine whether the points within the second LiDAR point cloud line up with the points within the first LiDAR point cloud, and, when the points within the second LiDAR point cloud do not line up with the points within the first LiDAR point cloud, determine that the object is moving.

According to various embodiments, the processor may be further configured to, when the points within the second LiDAR point cloud do not line up with the points within the first LiDAR point cloud, determine a velocity of the object based on a difference in position between the points within the second LiDAR point cloud and the points within the first LiDAR point cloud.

According to various embodiments, the processor may be further configured to, when the points within the second LiDAR point cloud line up with the points within the first LiDAR point cloud, determine that the object is not moving.

According to various embodiments, the first LiDAR point cloud is generated using a single scan from the spinning LiDAR system.

According to various embodiments, the second LiDAR point cloud is generated using a single scan from the scanning LiDAR system.

According to various embodiments, the spinning LiDAR system is coupled to the scanning LiDAR system.

According to various embodiments, the system may further comprise the vehicle.

According to yet another aspect of the present disclosure, a system for detecting and measuring object velocity is provided. The system comprises a spinning LiDAR system, coupled to a vehicle, configured to generate a first LiDAR point cloud of an environment surrounding the vehicle, a scanning LiDAR system, coupled to the vehicle, configured to generate a second LiDAR point cloud of the environment surrounding the vehicle, and a computing device, comprising a processor and a memory, coupled to the vehicle, configured to store programming instructions that, when executed by the processor, cause the processor to identify points within the first LiDAR point cloud coinciding with a position of an object and points within the second LiDAR point cloud coinciding with a position of the object, determine whether the points within the second LiDAR point cloud line up with the points within the first LiDAR point cloud, and, when the points within the second LiDAR point cloud do not line up with the points within the first LiDAR point cloud, determine that the object is moving.

According to various embodiments, the programming instructions may be further configured, when executed by the processor, to cause the processor to, when the points within the second LiDAR point cloud do not line up with the points within the first LiDAR point cloud, determine a velocity of the object based on a difference in position between the points within the second LiDAR point cloud and the points within the first LiDAR point cloud.

According to various embodiments, the programming instructions may be further configured, when executed by the processor, to cause the processor to, when the points within the second LiDAR point cloud line up with the points within the first LiDAR point cloud, determine that the object is not moving.

According to various embodiments, the first LiDAR point cloud is generated using a single scan from the spinning LiDAR system.

According to various embodiments, the second LiDAR point cloud is generated using a single scan from the scanning LiDAR system.

According to various embodiments, the spinning LiDAR system is coupled to the scanning LiDAR system.

According to various embodiments, the system may further comprise the vehicle.

DETAILED DESCRIPTION

Figure 1:
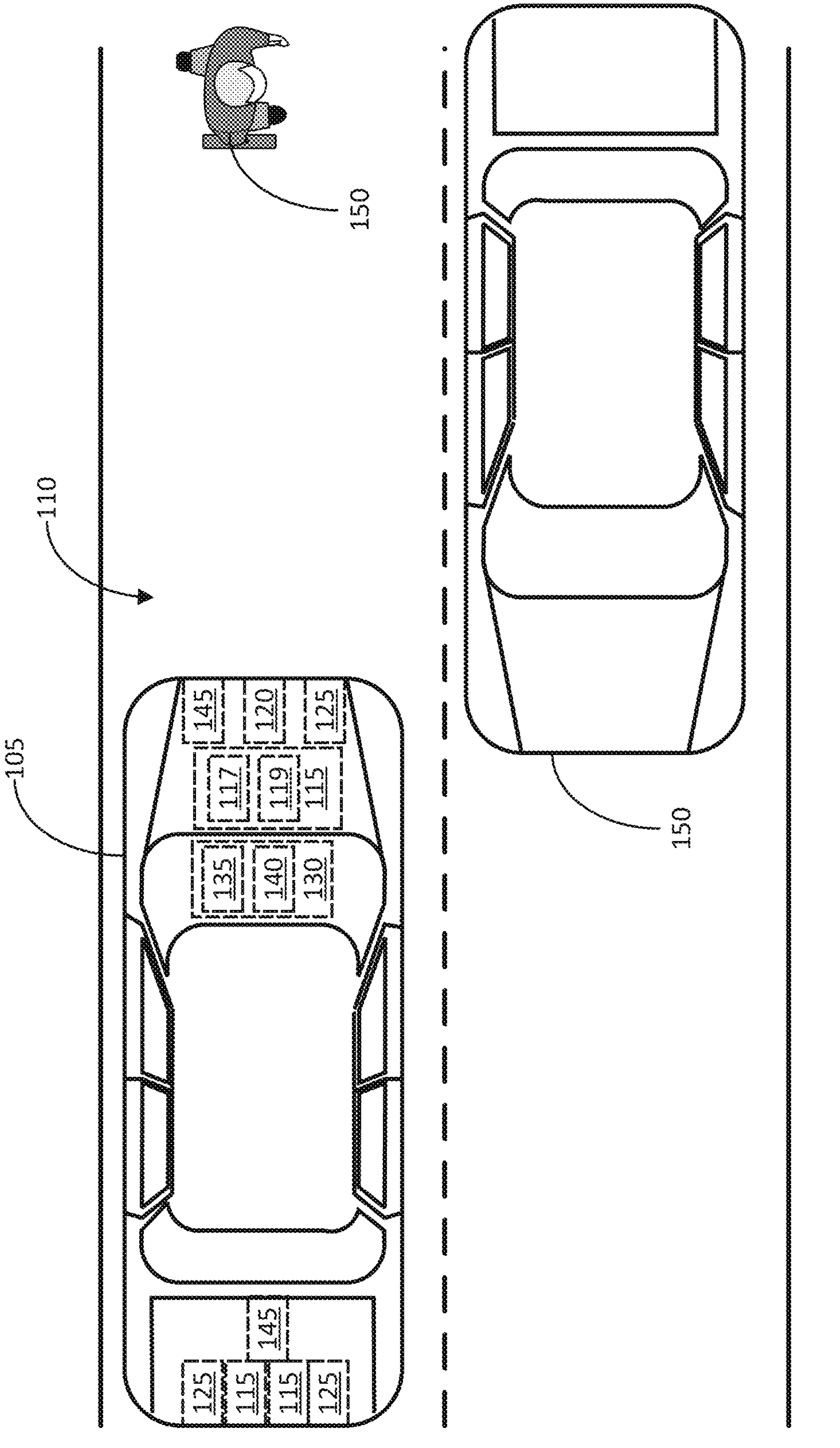
FIG. 1 illustrates an example Light Detection and Ranging (LiDAR)-equipped vehicle on a roadway, according to various embodiments of the present disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

An "electronic device" or a "computing device" refers to a device that includes a processor and memory. Each device may have its own processor and/or memory, or the processor and/or memory may be shared with other devices as in a virtual machine or container arrangement. The memory may contain or receive programming instructions that, when executed by the processor, cause the electronic device to perform one or more operations according to the programming instructions.

The terms "memory," "memory device," "computer-readable storage medium," "data store," "data storage facility" and the like each refer to a non-transitory device on which computer-readable data, programming instructions or both are stored. Except where specifically stated otherwise, the terms "memory," "memory device," "computer-readable storage medium," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "module" refers to a set of computer-readable programming instructions, as executed by a processor, that cause the processor to perform a specified function.

The term "vehicle," or other similar terms, refers to any motor vehicles, powered by any suitable power source, capable of transporting one or more passengers and/or cargo. The term "vehicle" includes, but is not limited to, autonomous vehicles (i.e., vehicles not requiring a human operator and/or requiring limited operation by a human operator, either onboard or remotely), automobiles (e.g., cars, trucks, sports utility vehicles, vans, buses, commercial vehicles, class 8 trucks etc.), boats, drones, trains, and the like.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable programming instructions executed by a processor, controller, or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network-coupled computer systems so that the computer readable media may be stored and executed in a distributed fashion such as, e.g., by a telematics server or a Controller Area Network (CAN).

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value.

Hereinafter, some embodiments of the present disclosure will be described in detail with reference to the drawings. In the drawings, the same reference numerals will be used throughout to designate the same or equivalent elements. In addition, a detailed description of well-known features or functions will be ruled out in order not to unnecessarily obscure the gist of the present disclosure.

Hereinafter, systems and methods for detecting one or more objects within an environment surrounding a vehicle and detecting and measuring a velocity of the one or more objects, using a combination of spinning LiDAR systems and scanning LiDAR systems, according to embodiments of the present disclosure, will be described with reference to the accompanying drawings.

Referring now to FIG. 1, an example LiDAR-equipped vehicle 105 on a roadway 110 is shown, in accordance with various embodiments of the present disclosure.

According to various embodiments, the vehicle 105 comprises one or more sensors such as, for example, one or more LiDAR sensors 115 (e.g., a spinning LiDAR sensor 117, a scanning LiDAR sensor 119, etc.), one or more radio detection and ranging (RADAR) sensors 120, and one or more cameras 125, one or more ultrasonic transducers 145, among other suitable sensors. According to various embodiments, the one or more sensors may be in electronic communication with one or more computing devices 130. The computing devices 130 may be separate from the one or more sensors and/or may be incorporated into the one or more sensors. The vehicle 105 may comprise a LiDAR system which comprises one or more LiDAR sensors 115 and/or one or more computing devices 130. For example, the vehicle 105 may comprise a spinning LiDAR system, a scanning LiDAR system, and/or a combination spinning and scanning LiDAR system.

In the example of FIG. 1, the LiDAR sensor(s) 115, 117, 119 may be configured to emit light, which strikes material (e.g., the roadway 110, one or more objects 150 within the environment surrounding the vehicle 105. Once the light emitted from the LiDAR sensor 115 comes into contact with the material, the light is deflected. Some of the deflected light bounces back to the LiDAR sensors 115, 117, 119. The LiDAR sensors 115, 117, 119 may be configured to measure data pertaining to the light bounced back (for example, the distance traveled by the light, the length of time it took for the light to travel from and to the LiDAR sensor s 115, 117, 119, the intensity of the light returning to the LiDAR sensor s 115, 117, 119, and so on as understood by a person of ordinary skill). This data may then be used to generate one or more point clouds (i.e., data points, in a coordinate system, which represent locations of objects within an environment) of some or all of the environment surrounding the vehicle 105, generally recreating an object map of the road surface of the roadway 110, objects 150 within the environment, and so on. According to various embodiments, a point cloud may be generated for each of the LiDAR sensor s 115, 117, 119 (e.g., a first point cloud, a second point cloud, etc.).

According to various embodiments, the one or more LiDAR sensor s 115, 117, 119 may be coupled to the vehicle 105, may be coupled to one or more other LiDAR sensors 115, 117, 119, and/or may be configured to generate one or more point clouds of an environment surrounding the vehicle 105. The environment may fully surround the vehicle or may encompass a portion of the vehicle's 105 surroundings.

According to various embodiments, the LiDAR sensors 115 may comprise a spinning LiDAR sensor 117 and a scanning LiDAR sensor 119. The spinning LiDAR sensor 117 may be configured to rotate 360° and take a "shot" of a scene of the vehicle environment, meaning that all points on a vertical line are acquired at approximately the same time by the spinning LiDAR sensor 117. In contrast, the scanning LiDAR sensor 119 may be configured to acquire points in an iterative fashion, moving upward sequentially to image an area in front of the scanning LiDAR sensor 119.

Since the spinning LiDAR sensor 117 captures all points on a vertical line at approximately the same time, the points corresponding to an object will form an approximately vertical line of points in the point cloud generated by a scan from the spinning LiDAR sensor 117.

If an object is stationary or if the autonomous vehicle is moving, then at the same speed as the autonomous vehicle, the object, when scanned by the scanning LiDAR sensor 119, will form an approximately vertical line of points, similar to the scan from the spinning LiDAR sensor 117. However, if the object is in motion and not stationary (e.g., has a relative speed), the object, when scanned by the scanning LiDAR sensor 119, will form a series of points which are slanted in relation to the series of points generated by the spinning LiDAR sensor 117.

According to various embodiments, the degree of this slant may be used to directly estimate the speed of the object (e.g., another vehicle) using a single scan from the spinning LiDAR sensor 117 and the scanning LiDAR sensor 119, without needing to take several scans into account. According to various embodiments, this estimation would happen as part of a deep learning framework that analyzes the points by clustering. For example, the deep learning framework may be configured to estimate position of an object, size of an object, and/or estimated velocity of an object.

According to various embodiments, for an x-y-z coordinate plane, when the scanning LiDAR scans an object, the scanning LiDAR sensor 119 may be configured to sweep the x coordinates in the field of view for a same first y coordinate. According to various embodiments, after scanning all the x coordinates for the first y coordinate, the scanning LiDAR 119 may be configured to scan the first x coordinate at the next y coordinate. According to various embodiments, if an object is stationary with respect to the autonomous vehicle 105, then the next y coordinate at the first x coordinate will return at the same distance as the first y coordinate at the first x coordinate. According to various embodiments, if the object is moving with a relative speed to the autonomous vehicle, then the next y coordinate at the first x coordinate will be nearer (if the object is slower than the autonomous vehicle) or farther away (if the object is faster than the AV).

According to various embodiments, for an object that has a plane surface, a line that is angled relative to the spinning LiDAR scan may be formed. According to various embodiments, the angle of the line of all the scanned y coordinates at a single x coordinate in the scanning field of view may be used to calculate the speed. The speed may be calculated based on a change in distance from the top of the slanted line relative to the perpendicular line. This may be calculated based on a difference in the distance measurements from the first y coordinate distance and the last y coordinate distance in the same scan (e.g., the point that is the first scan point in a single scan at the first x coordinate and the last scan point in the scan at the same first x coordinate) divided by a difference in time between the scan of those two points. This may correlate to an angle of slant of the line if distance versus time of the scan is mapped.

According to various embodiments, when an object is not planar relative to the scan (i.e., the scan is over a portion of the rear of a car as opposed to the relatively planar surface of the rear of a truck), then the distance coordinates from the spinning lidar (where all of the y coordinate values for the same x coordinate value are taken at the same time) may be used to offset the distances for each of the y coordinate returns for the same x coordinate. Thus, according to various embodiments, each y coordinate value may be compared between the two LiDAR scanners 119, and the difference in time between those two same x,y points at the same time, t, for scanning may be used to calculate the slanted line relative to vertical. The same process may, according to various embodiments, be used to calculate the relative speed of the other object by comparing the difference in time on the scanning lidar returns between the return at the first x coordinate at the first y coordinate and the return of the first x coordinate at the last y coordinate during the same scan.

According to various embodiments, the computing device 130 may comprise a processor 135 and/or a memory 140. The memory 140 may be configured to store programming instructions that, when executed by the processor 135, are configured to cause the processor 135 to perform one or more tasks such as, e.g., generating the one or more point clouds (e.g., a first LiDAR point cloud from points generated by a spinning LiDAR sensor 117, a second LiDAR point cloud form from points generated by a scanning LiDAR sensor 119, etc.), identifying points within the first LiDAR point cloud coinciding with a position of an object, identifying points within the second LiDAR point cloud coinciding with a position of the object, determine whether the points within the second LiDAR point cloud are slanted in relation to the points within the first LiDAR point cloud, determining that the object is moving when the points within the second LiDAR point cloud are slanted in relation to the points within the first LiDAR point cloud, determining a velocity of the object based on a slant between the points within the second LiDAR point cloud and the points within the first LiDAR point cloud when the points within the second LiDAR point cloud are slanted in relation to the points within the first LiDAR point cloud, determining that the object is not moving when the points within the second LiDAR point cloud are not slanted in relation to the points within the first LiDAR point cloud, among other functions.

Figure 2:
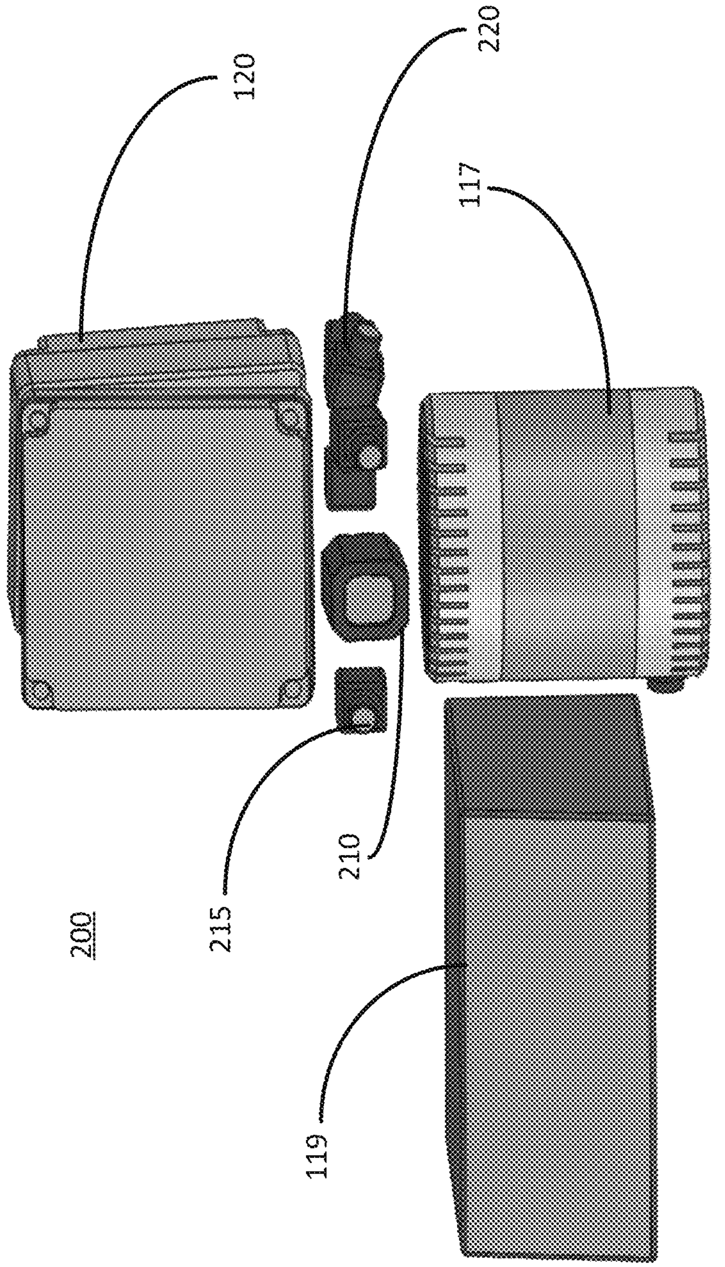
FIG. 2 is an example sensor pod for use with a LiDAR-equipped vehicle, according to various embodiments of the present disclosure.
Figure 3:
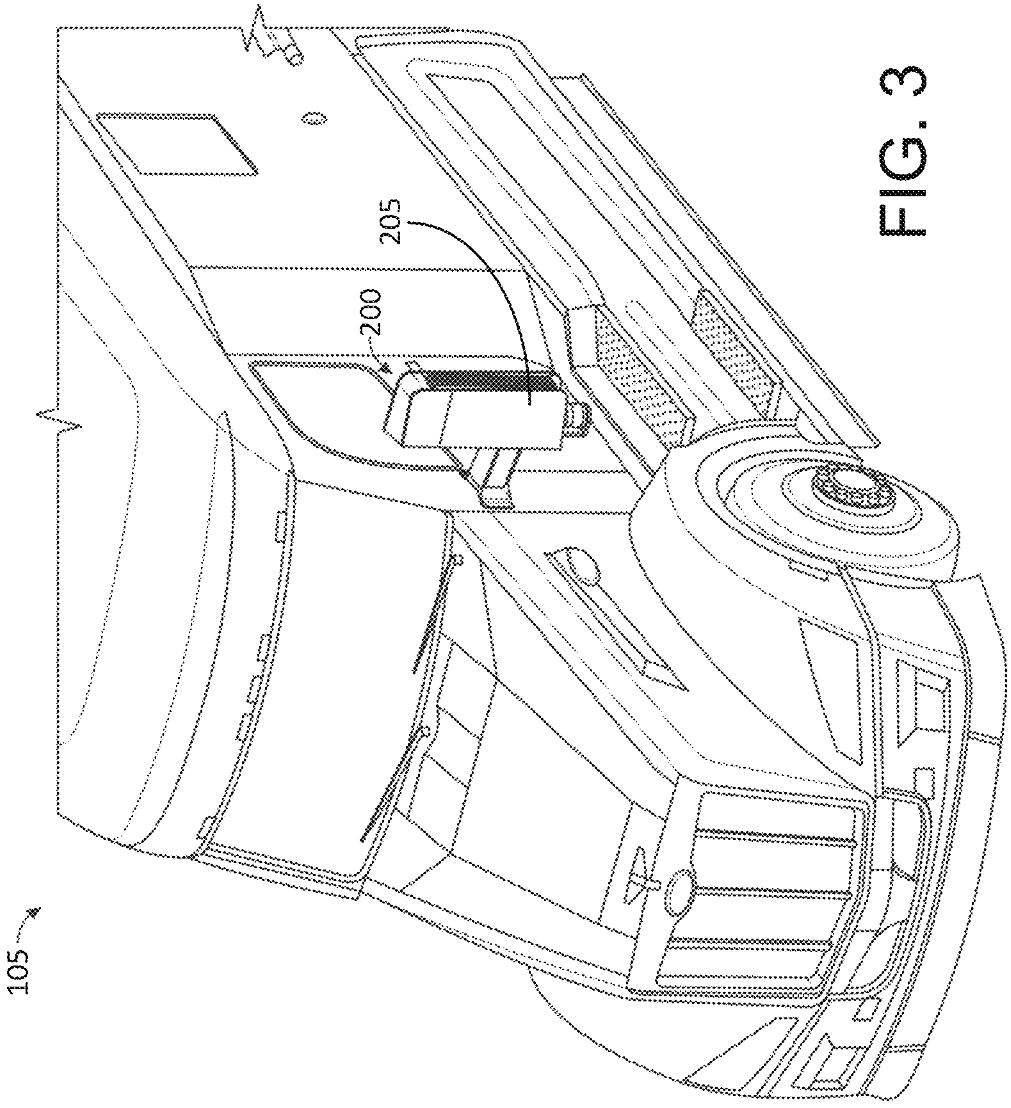
FIG. 3 is an example LiDAR-equipped vehicle with a sensor pod, according to various embodiments of the present disclosure

According to various embodiments, the spinning LiDAR sensor 117 and the scanning LiDAR sensor 119 may be housed within a sensor pod 200, as shown in FIG. 2. According to various embodiments, the sensor pod 200 may be positioned as a suitable position along a vehicle such as, e.g., on or near the sideview mirror 205, as shown in FIG. 3. As shown in FIG. 3, all of the components of the sensor pod 200 may be housed within the sideview mirror assembly 205 of the vehicle 105.

The sensor pod 200 may comprise imaging technology such as, e.g., a spinning LiDAR sensor 117, a scanning LiDAR sensor 119, one or more RADAR sensors 120, one or more cameras 125 (e.g., a thermal camera 210, a narrow, long range camera 215, a wide camera 220, and/or other suitable cameras), and/or other suitable imaging technology. According to various embodiments, the imaging technology may not move in relation to each other. According to various embodiments, the imaging technology may be configured to image approximately the same points of an environment surrounding the vehicle 105.

Figure 4:
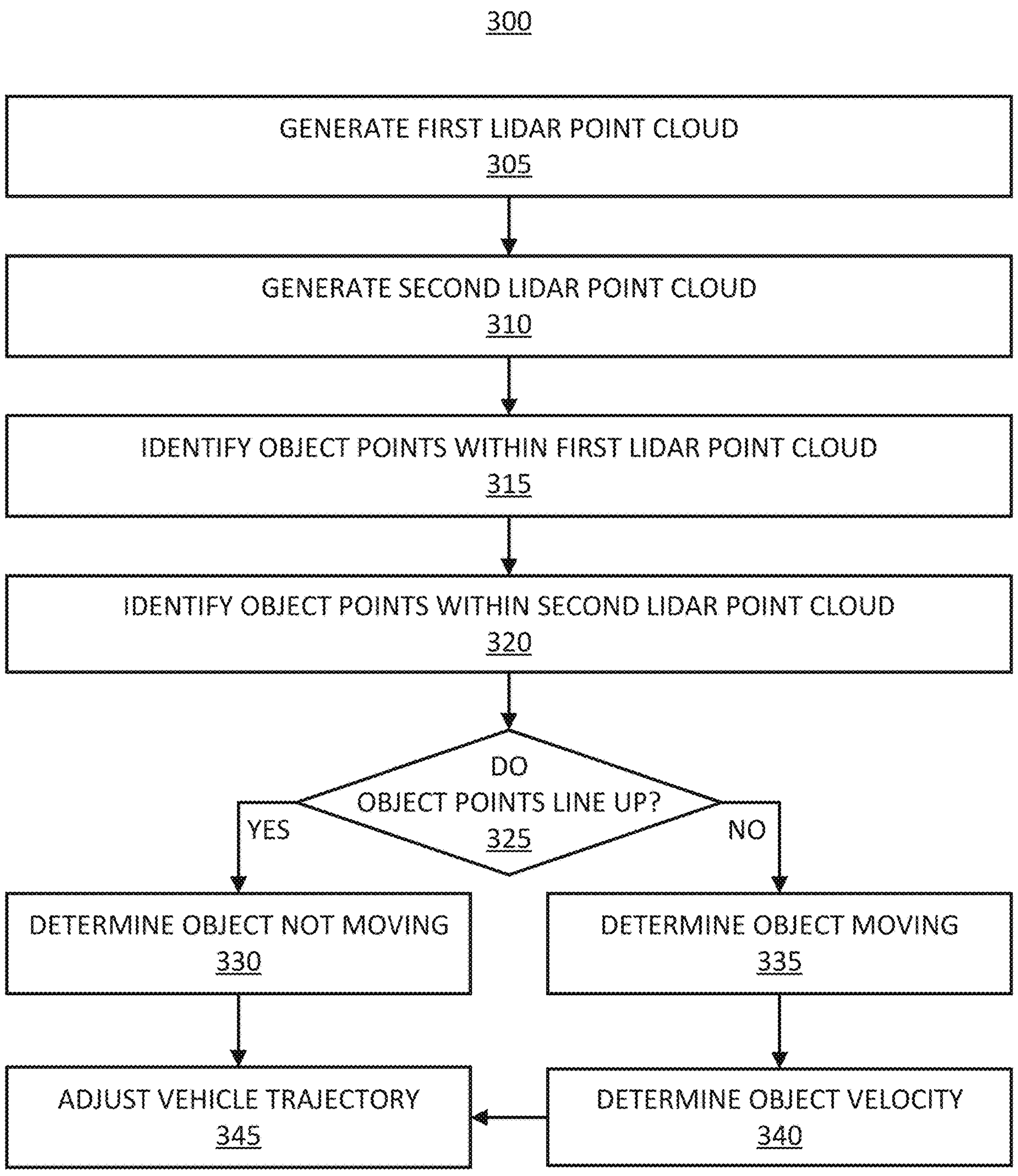
FIG. 4 is an example flowchart of a method for detecting and measuring object velocity using a LiDAR-equipped vehicle, according to various embodiments of the present disclosure.

Referring now to FIG. 4, an example flowchart of a method 300 for detecting and measuring object velocity using a LiDAR-equipped vehicle is described, in accordance with various embodiments of the present disclosure.

At 305, a first LiDAR point cloud is generated using a spinning LiDAR system coupled to the vehicle and, at 310, a second LiDAR point cloud is generated using a scanning LiDAR system coupled to the vehicle. According to various embodiments, the spinning LiDAR system and the scanning LiDAR system are coupled to each other. It is noted, however, that, in some embodiments, the spinning LiDAR system is not coupled to the scanning LiDAR system. The spinning LiDAR system and/or the scanning LiDAR system may comprise one or more LiDAR sensors and at least one computer memory and computer processor. According to various embodiments, the one or more LiDAR point clouds are representative of all or part of a vehicle's surrounding environment.

At 315, the first LiDAR point cloud is analyzed in order to identify points within the first LiDAR point cloud that coincide with a position of an object within the vehicle's surrounding environment. As 320, the second LiDAR point cloud is analyzed in order to identify points within the second LiDAR point cloud that coincide with a position of the object within the vehicle's surrounding environment.

At 325, it is determined whether the points within the second LiDAR point cloud, coinciding with the object, are lined up with the points within the first LiDAR point cloud, coinciding with the object.

At 330, when the points within the second LiDAR point cloud line up with the points within the first LiDAR point cloud, it is determined that the object is not moving. According to various embodiments, at 345, a trajectory of the vehicle is adjusted based on characteristics (e.g., position, movement, shape, etc.) of the object.

At 335, when the points within the second LiDAR point cloud do not line up with the points within the first LiDAR point cloud, it is determined that the object is moving. When it is determined that the object is moving, then, at 340, a velocity of the object is determined based on a difference in position between the points within the second LiDAR point cloud and the points within the first LiDAR point cloud. According to various embodiments, at 345, a trajectory of the vehicle is adjusted based on characteristics (e.g., position, movement, shape, etc.) of the object.

According to various embodiments, the first LiDAR point cloud and/or the second LiDAR point cloud are generated using a single scan from their respective LiDAR systems.

Figure 5:
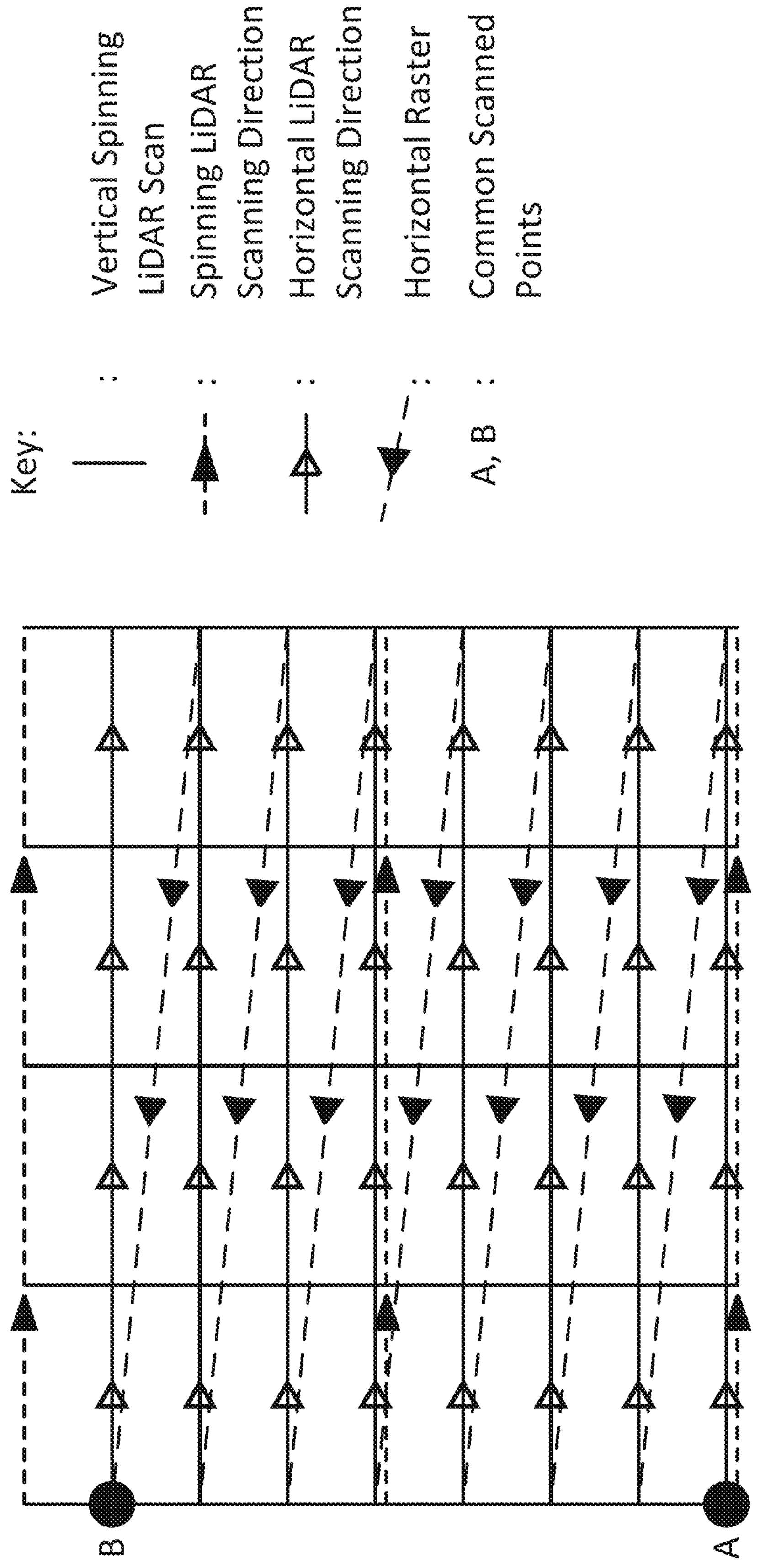
FIG. 5 is an example LiDAR scan of scanned LiDAR points, according to various embodiments of the present disclosure.

Referring now to FIG. 5, an example LiDAR scan of scanned LiDAR points is illustratively depicted, in accordance with various embodiments of the present disclosure.

According to the embodiment of FIG. 5, points A and B are commonly scanned points, and the spinning LiDAR may have returns at time to for points A and B.

According to various embodiments, the spinning LiDAR comprises a vertical scanning lase and may continue to rotate the vertical scanning laser through space from left to right.

According to various embodiments, the scanning LiDAR has a return for point A at time to, and then scans horizontally, returning back to the left side after reaching the end of the scanning space on the right.

At time $t_0$+del(t), the distance to point B, calculated in the returns, will be dependent on the velocity of point B, and the velocity of point B, relative to the spinning LiDAR system and the scanning LiDAR system, is the difference in position between the two point B returns divided, by del(t).

Figure 6:
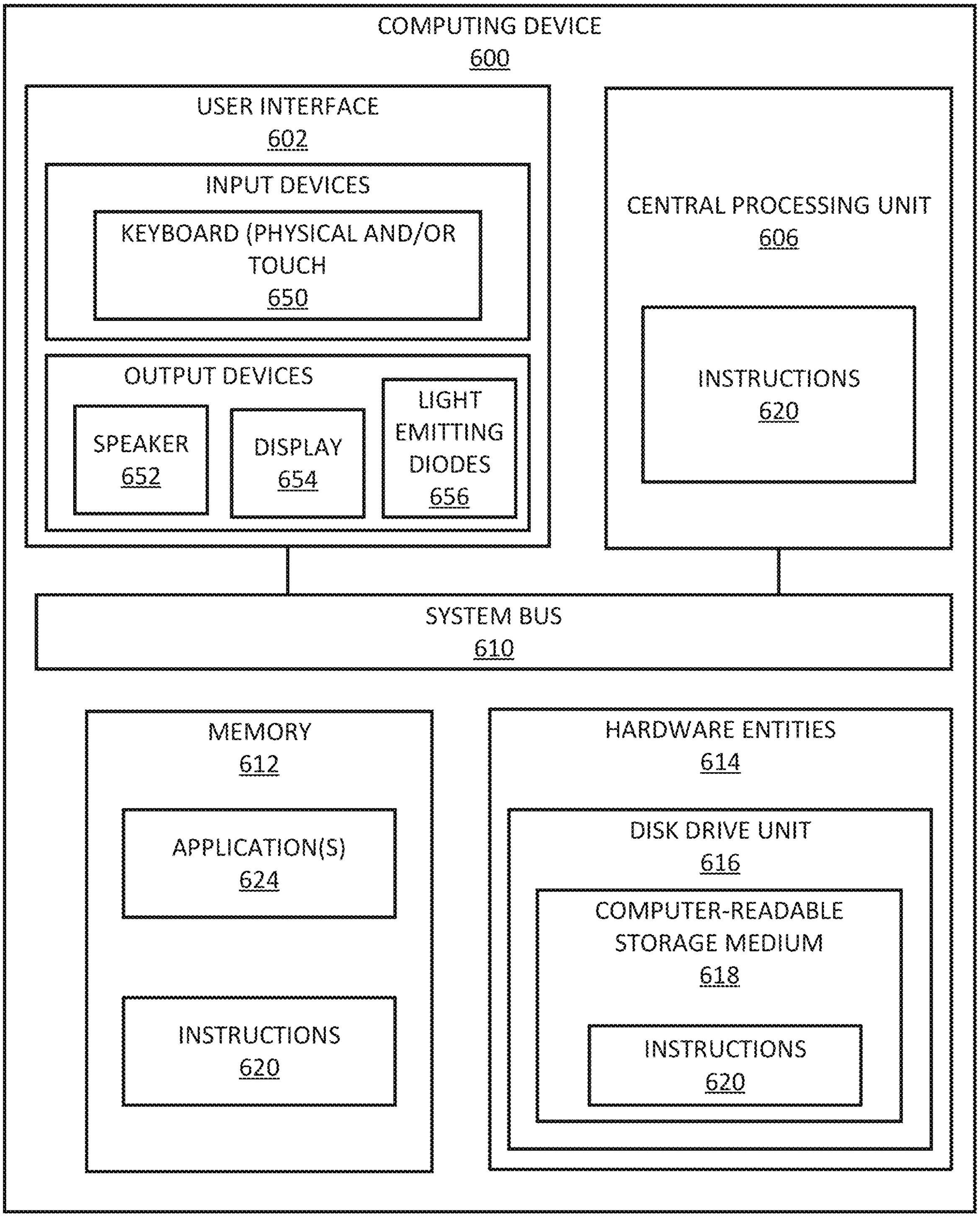
FIG. 6 illustrates example elements of a computing device, according to various embodiments of the present disclosure.

Referring now to FIG. 6, an illustration of an example architecture for a computing device 600 is provided. The computing device 130 of FIG. 1 may be the same as or similar to computing device 600. As such, the discussion of computing device 600 is sufficient for understanding the computing device 130 of FIG. 1, for example.

Computing device 600 may include more or less components than those shown in FIG. 1. The hardware architecture of FIG. 6 represents one example implementation of a representative computing device configured to perform one or more methods and means for detecting and measuring the velocities of one or more objects from LiDAR point clouds, as described herein. As such, the computing device 600 of FIG. 6 implements at least a portion of the method(s) described herein (for example, method 300 of FIG. 4).

Some or all components of the computing device 600 can be implemented as hardware, software and/or a combination of hardware and software. The hardware includes, but is not limited to, one or more electronic circuits. The electronic circuits can comprise, but are not limited to, passive components (e.g., resistors and capacitors) and/or active components (e.g., amplifiers and/or microprocessors). The passive and/or active components may be adapted to, arranged to and/or programmed to perform one or more of the methodologies, procedures, or functions described herein.

As shown in FIG. 6, the computing device 600 comprises a user interface 602, a Central Processing Unit ("CPU") 606, a system bus 610, a memory 612 connected to and accessible by other portions of computing device 600 through system bus 610, and hardware entities 614 connected to system bus 610. The user interface can include input devices and output devices, which facilitate user-software interactions for controlling operations of the computing device 600. The input devices include, but are not limited to, a physical and/or touch keyboard 650. The input devices can be connected to the computing device 600 via a wired or wireless connection (e.g., a Bluetooth® connection). The output devices include, but are not limited to, a speaker 652, a display 654, and/or light emitting diodes 656.

At least some of the hardware entities 614 perform actions involving access to and use of memory 612, which can be a Random Access Memory (RAM), a disk driver and/or a Compact Disc Read Only Memory (CD-ROM), among other suitable memory types. Hardware entities 614 can include a disk drive unit 616 comprising a computer-readable storage medium 618 on which is stored one or more sets of instructions 620 (e.g., programming instructions such as, but not limited to, software code) configured to implement one or more of the methodologies, procedures, or functions described herein. The instructions 620 can also reside, completely or at least partially, within the memory 612 and/or within the CPU 606 during execution thereof by the computing device 600. The memory 612 and the CPU 606 also can constitute machine-readable media. The term "machine-readable media", as used here, refers to a single medium or multiple media (e.g., a centralized or distributed database, and/or associated caches and servers) that store the one or more sets of instructions 620. The term "machine-readable media", as used here, also refers to any medium that is capable of storing, encoding or carrying a set of instructions 620 for execution by the computing device 600 and that cause the computing device 600 to perform any one or more of the methodologies of the present disclosure.

Figure 7:
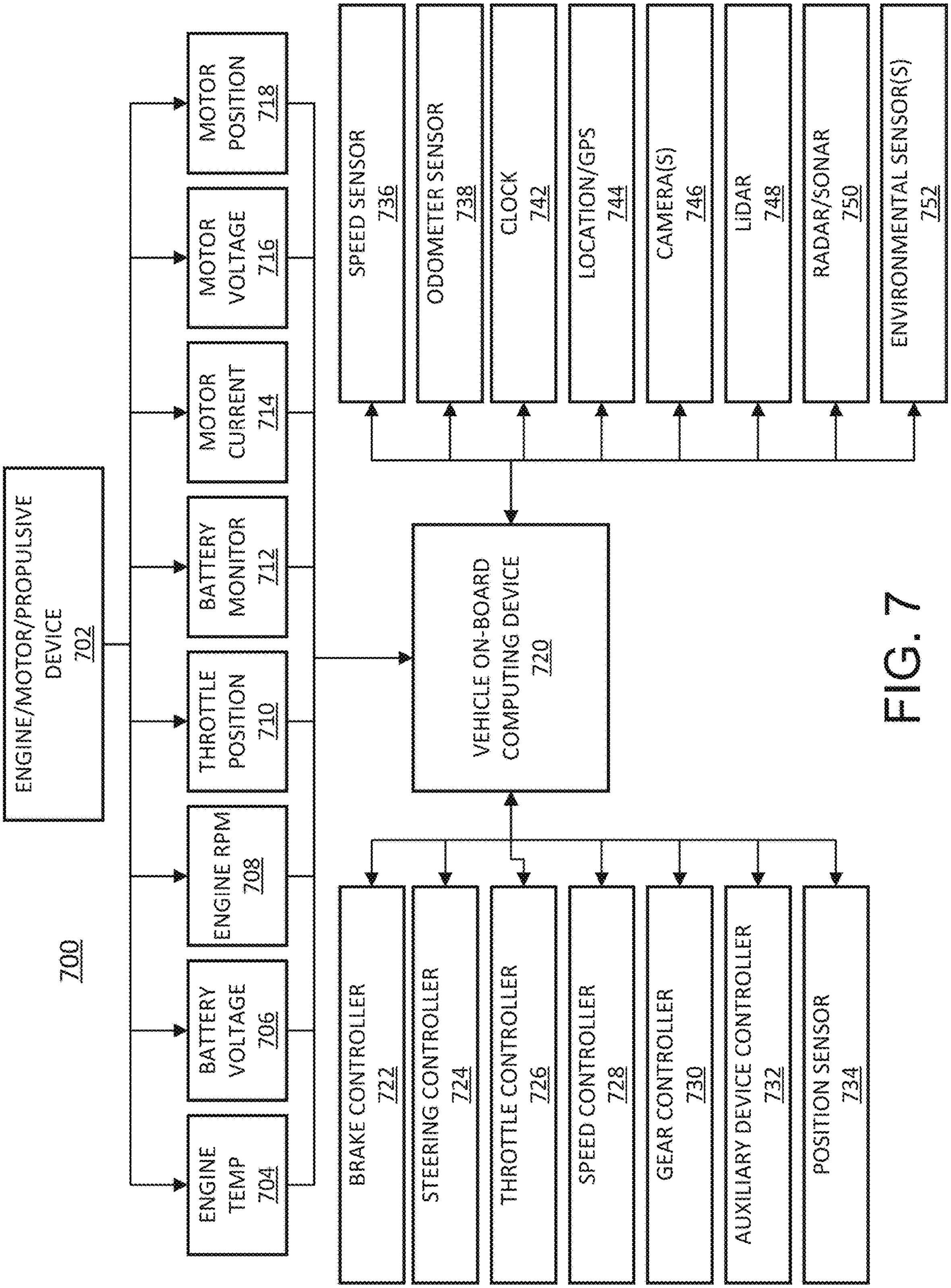
FIG. 7 illustrates example architecture of a vehicle, according to various embodiments of the present disclosure.

Referring now to FIG. 7, example vehicle system architecture 700 for a vehicle is provided, in accordance with various embodiments of the present disclosure.

Vehicle 105 of FIGS. 1 and 3 can have the same or similar system architecture as that shown in FIG. 7. Thus, the following discussion of vehicle system architecture 700 is sufficient for understanding vehicle 105 of FIGS. 1 and 3.

As shown in FIG. 7, the vehicle system architecture 700 includes an engine, motor or propulsive device (e.g., a thruster) 702 and various sensors 704-718 for measuring various parameters of the vehicle system architecture 700. In gas-powered or hybrid vehicles having a fuel-powered engine, the sensors 704-718 may include, for example, an engine temperature sensor 704, a battery voltage sensor 706, an engine Rotations Per Minute (RPM) sensor 708, and/or a throttle position sensor 710. If the vehicle is an electric or hybrid vehicle, then the vehicle may have an electric motor, and accordingly will have sensors such as a battery monitoring system 712 (to measure current, voltage and/or temperature of the battery), motor current 714 and voltage 716 sensors, and motor position sensors such as resolvers and encoders 718.

Operational parameter sensors that are common to both types of vehicles include, for example: a position sensor 734 such as an accelerometer, gyroscope and/or inertial measurement unit; a speed sensor 736; and/or an odometer sensor 738. The vehicle system architecture 700 also may have a clock 742 that the system uses to determine vehicle time during operation. The clock 742 may be encoded into the vehicle on-board computing device 720, it may be a separate device, or multiple clocks may be available.

The vehicle system architecture 700 also may include various sensors that operate to gather information about the environment in which the vehicle is traveling. These sensors may include, for example a location sensor 744 (for example, a Global Positioning System (GPS) device); object detection sensors such as one or more cameras 746: a LIDAR sensor system 748 (e.g., a spinning LiDAR sensor system, a scanning LiDAR sensor system, and/or other suitable LIDAR sensor systems); and/or a radar and/or a sonar system 750. The sensors also may include environmental sensors 752 such as a precipitation sensor and/or ambient temperature sensor. The object detection sensors may enable the vehicle system architecture 700 to detect objects that are within a given distance range of the vehicle 700 in any direction, while the environmental sensors 752 collect data about environmental conditions within the vehicle's area of travel.

During operations, information is communicated from the sensors to an on-board computing device 720. The on-board computing device 720 may be configured to analyze the data captured by the sensors and/or data received from data providers, and may be configured to optionally control operations of the vehicle system architecture 700 based on results of the analysis. For example, the on-board computing device 720 may be configured to control: braking via a brake controller 722; direction via a steering controller 724; speed and acceleration via a throttle controller 726 (in a gas-powered vehicle) or a motor speed controller 728 (such as a current level controller in an electric vehicle); a differential gear controller 730 (in vehicles with transmissions); and/or other controllers.

Geographic location information may be communicated from the location sensor 744 to the on-board computing device 720, which may then access a map of the environment that corresponds to the location information to determine known fixed features of the environment such as streets, buildings, stop signs and/or stop/go signals. Captured images from the cameras 746 and/or object detection information captured from sensors such as LiDAR 748 is communicated from those sensors to the on-board computing device 720. The object detection information and/or captured images are processed by the on-board computing device 720 to detect objects in proximity to the vehicle. Any known or to be known technique for making an object detection based on sensor data and/or captured images may be used in the embodiments disclosed in this document.

The features and functions described above, as well as alternatives, may be combined into many other different systems or applications. Various alternatives, modifications, variations or improvements may be made by those skilled in the art, each of which is also intended to be encompassed by the disclosed embodiments.

What is claimed is:

1. A method for detecting and measuring object velocity, comprising:
- using a spinning Light Detection and Ranging (LiDAR) system, generating a first LiDAR point cloud of an environment surrounding a vehicle;
- using a scanning LiDAR system, generating a second LiDAR point cloud of the environment surrounding the vehicle; and
- using a processor:
  - identifying:
    - points within the first LiDAR point cloud coinciding with a position of an object; and
    - points within the second LiDAR point cloud coinciding with a position of the object;
  - determining whether the points within the second LiDAR point cloud line up with the points within the first LiDAR point cloud; and
  - when the points within the second LiDAR point cloud do not line up with the points within the first LiDAR point cloud, determining that the object is moving.

2. The method of claim 1, further comprising, using the processor, when the points within the second LiDAR point cloud do not line up with the points within the first LiDAR point cloud, determining a velocity of the object based on a difference in position between the points within the second LiDAR point cloud and the points within the first LiDAR point cloud.

3. The method of claim 1, further comprising, using the processor, when the points within the second LiDAR point cloud line up with the points within the first LiDAR point cloud, determining that the object is not moving.

4. The method of claim 1, wherein the first LiDAR point cloud is generated using a single scan from the spinning LiDAR system.

5. The method of claim 1, wherein the second LiDAR point cloud is generated using a single scan from the scanning LiDAR system.

6. The method of claim 1, wherein the spinning LiDAR system is coupled to the scanning LiDAR system.

7. A system for detecting and measuring object velocity, comprising:
- a spinning Light Detection and Ranging (LiDAR) system, coupled to a vehicle, configured to generate a first LiDAR point cloud of an environment surrounding the vehicle;
- a scanning LiDAR system, coupled to the vehicle, configured to generate a second LiDAR point cloud of the environment surrounding the vehicle; and
- a processor, configured to:
  - identify:
    - points within the first LiDAR point cloud coinciding with a position of an object; and
    - points within the second LiDAR point cloud coinciding with a position of the object;
  - determine whether the points within the second LiDAR point cloud line up with the points within the first LiDAR point cloud; and
  - when the points within the second LiDAR point cloud do not line up with the points within the first LiDAR point cloud, determine that the object is moving.

8. The system of claim 7, wherein the processor is further configured to, when the points within the second LiDAR point cloud do not line up with the points within the first LiDAR point cloud, determine a velocity of the object based on a difference in position between the points within the second LiDAR point cloud and the points within the first LiDAR point cloud.

9. The system of claim 7, wherein the processor is further configured to, when the points within the second LiDAR point cloud line up with the points within the first LiDAR point cloud, determine that the object is not moving.

10. The system of claim 7, wherein the first LiDAR point cloud is generated using a single scan from the spinning LiDAR system.

11. The system of claim 7, wherein the second LiDAR point cloud is generated using a single scan from the scanning LiDAR system.

12. The system of claim 7, wherein the spinning LiDAR system is coupled to the scanning LiDAR system.

13. The system of claim 7, further comprising the vehicle.

14. A system for detecting and measuring object velocity, comprising:

a spinning Light Detection and Ranging (LiDAR) system, coupled to a vehicle, configured to generate a first LiDAR point cloud of an environment surrounding the vehicle;

a scanning LiDAR system, coupled to the vehicle, configured to generate a second LiDAR point cloud of the environment surrounding the vehicle; and a computing device, comprising a processor and a memory, coupled to the vehicle, configured to store programming instructions that, when executed by the processor, cause the processor to:

identify:

points within the first LiDAR point cloud coinciding with a position of an object; and points within the second LiDAR point cloud coinciding with a position of the object;

determine whether the points within the second LiDAR point cloud line up with the points within the first LiDAR point cloud; and when the points within the second LiDAR point cloud do not line up with the points within the first LiDAR point cloud, determine that the object is moving.

15. The system of claim 14, wherein the programming instructions are further configured, when the points within the second LiDAR point cloud do not line up with the points within the first LiDAR point cloud, to cause the processor to determine a velocity of the object based on a difference in position between the points within the second LiDAR point cloud and the points within the first LiDAR point cloud.

16. The system of claim 14, wherein the programming instructions are further configured, when executed by the processor, when the points within the second LiDAR point cloud line up with the points within the first LiDAR point cloud, to cause the processor to determine that the object is not moving.

17. The system of claim 14, wherein the first LiDAR point cloud is generated using a single scan from the spinning LiDAR system.

18. The system of claim 14, wherein the second LiDAR point cloud is generated using a single scan from the scanning LiDAR system.

19. The system of claim 14, wherein the spinning LiDAR system is coupled to the scanning LiDAR system.

20. The system of claim 14, further comprising the vehicle.

* * * * *